United States Patent [19]
Kondo et al.

[11] Patent Number: 5,444,487
[45] Date of Patent: Aug. 22, 1995

[54] ADAPTIVE DYNAMIC RANGE ENCODING METHOD AND APPARATUS

[75] Inventors: Tetsujiro Kondo; Kunio Kawaguchi, both of Kanagawa, Japan

[73] Assignee: Sony Corporation, Tokyo, Japan

[21] Appl. No.: 162,273

[22] Filed: Dec. 7, 1993

[30] Foreign Application Priority Data

Dec. 10, 1992 [JP] Japan .................. 4-330593

[51] Int. Cl.6 .......................... H04N 7/40
[52] U.S. Cl. .................. 348/405; 348/419
[58] Field of Search ........... 348/421, 409, 410, 415, 348/405, 419, 407, 414; H04N 7/137

[56] References Cited

U.S. PATENT DOCUMENTS

| | | | |
|---|---|---|---|
| 4,677,479 | 6/1987 | Hatori et al. | 348/421 |
| 4,685,115 | 8/1987 | Akagiri et al. | 348/410 |
| 4,890,161 | 12/1989 | Kondo | 348/421 |
| 5,128,963 | 7/1992 | Akagiri | 348/409 |
| 5,243,420 | 9/1993 | Hibi | 348/409 |
| 5,283,814 | 2/1994 | Iwahashi et al. | 348/409 |

FOREIGN PATENT DOCUMENTS 0435163  7/1991 European Pat. Off. .
9114295  9/1991 WIPO .

OTHER PUBLICATIONS

Kondo, T., et al., "Adaptive Synamic Range Coding Scheme For Future HDTV Digital VTR." Prodceedings of the Fourth International Workshop on HDTV: Signal Processing of HDTV,III, Turin, IT, 4th–6th Sep. 1991. Elsevier Science Pub., Amsterdam, NL, pp. 43–50.

Primary Examiner—Howard W. Britton
Assistant Examiner—A. Au
Attorney, Agent, or Firm—Jay H. Maioli

[57] ABSTRACT

An adaptive dynamic range encoding method and device in which evaluation data mainly centered about the amount of the change in the spatial direction of picture data in a block is detected, and re-quantization is performed which will give a minimum value of the evaluation data. The re-quantization is performed at an optimum quantization step conforming to the picture in the block in such a manner that picture portions having the same level may remain at the same level after re-quantization. This renders it possible to eliminate quantization distortions from being produced in the reproduced picture.

4 Claims, 7 Drawing Sheets

ADAPTIVE DYNAMIC RANGE ENCODING METHOD AND APPARATUS

BACKGROUND OF THE INVENTION

1. Field of the Invention

This invention relates to an adaptive dynamic range encoding method and device conveniently employed for compressing picture data or the like. More particularly, it relates to a dynamic range encoding method and device which the replay picture quality may be improved when picture are recorded with a high compression density.

There has hitherto been known an adaptive dynamic range encoding device (ADRC) in which picture data supplied on the block basis, in which each block is made up of a pre-set number of pixels, are compressed in data length and outputted. With the dynamic range encoding device, the dynamic range as a local feature of a picture is defined on the block basis and redundancy mainly in the level direction is adaptively removed. The dynamic range encoding device also features reduced error propagation in the spatial direction.

Figure 1:
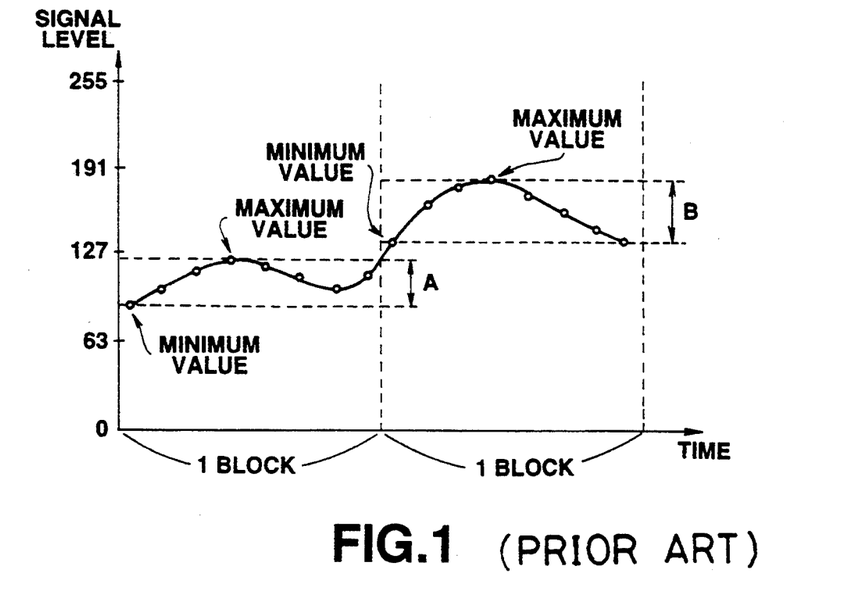
FIG. 1 is a chart for illustrating the theory of re-quantization of an adaptive dynamic range encoding device.

That is, picture data divided into blocks assume approximately equal level values because of strong local correlation. In addition, as shown in FIG. 1, in a 0–255 dynamic range of 8-bit data, one-block dynamic ranges A and B required for re-quantization of the block account for extremely small proportions. Consequently, smaller numbers of bits suffice for re-quantization. Thus the redundancy in the level direction may be significantly lowered by detecting the maximum and minimum values of picture data on the block basis and defining the one-block dynamic range.

Taking an example of compressing 8-bit picture data to 3-bit picture data, the adaptive dynamic range encoding device executes arithmetic and logical operations shown by the equation (1)

$$DR = MAX - MIN + 1$$
$$Q = [(L - MIN + 0.5) \times 2^n/DR]$$
$$L' = [(Q + 0.5) \times DR/2^n + MIN]$$
(1)

where DR, n, L, Q and L' denote the one-block dynamic range, bit allocation, data level of the pixel in the block, code for re-quantization and a restoration value, respectively, to divide a range between the maximum value MAX and the minimum value MIN in the block as shown at (A) in FIG. 1 by way of re-quantization.

It is possible with the adaptive dynamic range encoding device to statistically reduce the variance of errors. It is also possible to increase bit allocation because of the narrow quantization step. Consequently, the device is susceptible to restoration distortion or to the noise applied to the input picture data to only a lesser extent.

There is also known an adaptive dynamic range encoding device in which arithmetic and logical operations indicated by the following equation (2) are carried out to directly output the maximum value MAX and the minimum value MIN in the block as restoration values:

$$DR = MAX - MIN$$
$$Q = [(L - MIN) \times (2^n - 1)/DR + 0.5]$$
$$L' = [Q \times DR/(2^n - 1) + MIN + 0.5]$$
(2)

With the latter type adaptive dynamic range encoding device, since the maximum and minimum values are restored without distortions, the S/N ratio of picture data does not deteriorate despite reiteration of encoding and decoding operations a number of times.

However, the former type conventional adaptive dynamic range encoding device suffers from the drawback that the S/N ratio of the picture data deteriorates each time the encoding and decoding operations are executed.

The following Table 1 illustrates the values of the S/N ratio as obtained on encoding and decoding five standard digital pictures (Y data) supplied by the Television Association, namely a picture of a mountainous village in Switzerland (picture a), a picture of a tulip (picture b), a skin-colored chart (picture c), a woman wearing a hair-band (picture d) and a picture of weather forecasting (picture e), using the former type adaptive dynamic range encoding device, by 3-bit quantization, on the block basis, in which each block consists of 3 lines by 6 pixels for a field.

TABLE 1

| | ADRC | |
|---|---|---|
| picture | S/N(db) of conventional ADRC circuit | S/N(db) of conventional impertinent ADRC circuit |
| mountainous village in Switzerland (picture a) | 35.89 25.25 | 35.94 35.94 |
| tulip (picture b) | 37.19 26.61 | 37.22 37.22 |
| skin-colored chart (picture c) | 48.34 38.15 | 48.22 48.22 |
| woman wearing a hairband (picture d) | 43.38 32.59 | 43.31 43.31 |
| weather forecast (picture e) | 42.22 30.41 | 42.24 42.24 |

That is, the S/N ratio of the picture a of the mountainous village in Switzerland, which is 35.89 (db) on an encoding/decoding operation, as shown at the upper row for the picture a of Table 1, deteriorate to 25.25 (db) on reiteration of the encoding/decoding operations five times, as shown at the second row of Table 1. Similarly, the S/N ratio of the picture a of the tulip, which is 37.19 (db) on an encoding/decoding operation, as shown at the upper row for the picture b of FIG. 1, deteriorates to 26.61 (db) on reiteration of the encoding/decoding operations five times, as shown at the second row of Table 1.

On the other hand, with the latter type adaptive dynamic range encoding device, the S/N ratio of the picture a of the mountainous village in Switzerland on an encoding/decoding operation is 35.94 (db), while that on reiteration of the encoding/decoding operations five times is also 35.94 (db), so there is no deterioration of the S/N ratio. Similarly, the S/N ratio of the picture a of the tulip on an encoding/decoding operation is 37.22 (db), while that on reiteration of the encoding/decoding operations five times is also 37.22 (db), so that there is no deterioration of the S/N ratio.

However, with the latter type adaptive dynamic range encoding device, the quantization step widths are broader than those of the former type device. Consequently, if, with a block having a broad dynamic range, the picture data which is spatially continuous and substantially on the same level exists in the vicinity of the boundary of the quantization level steps, the picture portions which have appeared as continuous picture portions are divided into discrete portions having widths corresponding to the quantization step widths, thus presenting considerable restoration distortions and visually outstanding defects.

Figure 3:
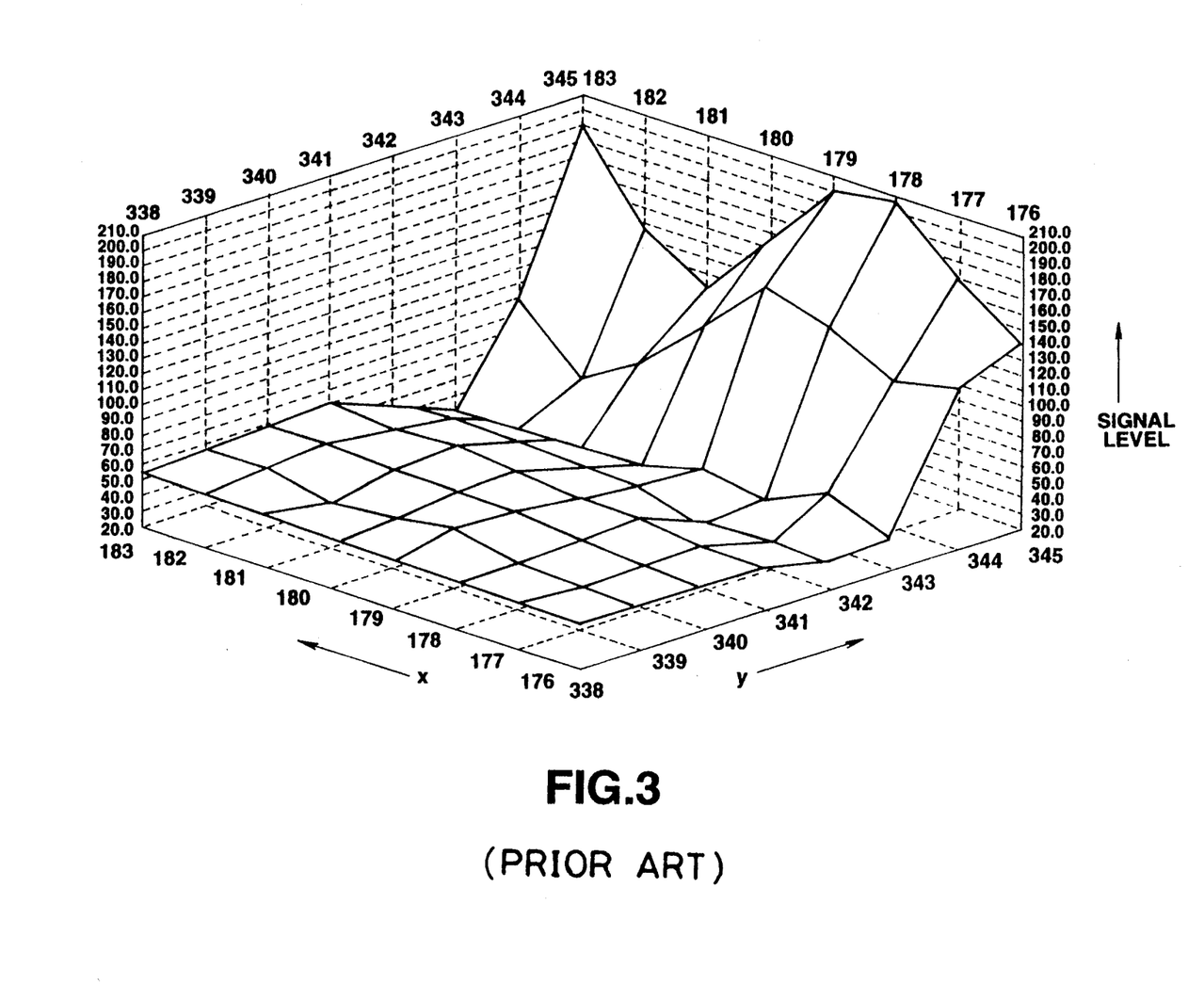
FIG. 3 illustrates the level distribution of picture data.
Figure 4:
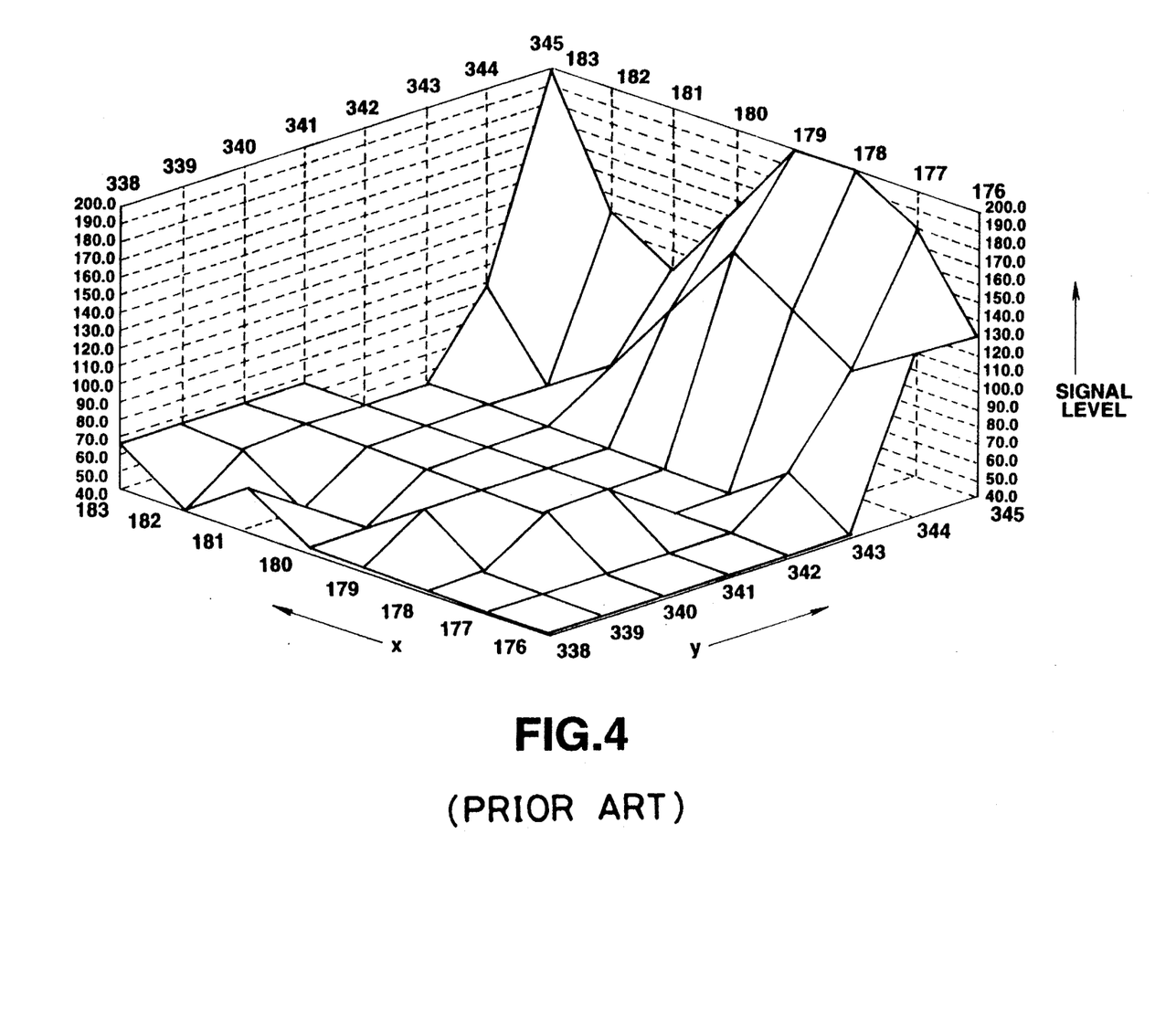
FIG. 4 illustrates the level distribution of picture data re-quantized by the conventional dynamic range encoding device.

Referring to FIG. 3, showing the level distribution of luminance data (Y data) for a block, the maximum value (MAX) and the minimum value (MIN) of the luminance data in the block are 207 and 42, respectively, with the dynamic range for the block being 165, there being a planar area in the vicinity of the level value of 50. If the luminance data for the planar portion is processed with a multi-stage 3-bit re-quantization with the above-mentioned latter type adaptive dynamic range encoding device, the quantization step width becomes equal to approximately 23.57, with the level distribution of the luminance data (Y data) of the block becoming as shown in FIG. 4, in which the planar portion in the vicinity of the level value of 50 being separated into a portion with the level value of 42 and a portion with the level value of 65 as a result of re-quantization. If the picture data presenting the same level is re-quantized into different level values, a problem occurs in that deterioration near the picture edges becomes noticeable.

The problem that exists due to re-quantization of the picture data of the same level to different level values becomes more pronounced for the lower bit rate, that is, for the higher degree of data compression.

Object and Summary of the Invention

In view of the above-depicted state of the art, it is an object of the present invention to provide an adaptive dynamic range encoding method and device in which the S/N ratio of the picture data does not deteriorate despite reiterated encoding/decoding operations and which is not susceptible to restoration distortions even upon high data compression or to adverse effects by the noise superimposed on the picture data.

According to the present invention, there is provided an adaptive dynamic range encoding device comprising re-quantization means for re-quantizing the picture information supplied from outside on the basis of blocks each consisting of a pre-set number of pixels for forming the re-quantized output picture information, evaluation means for detecting changes in the spatial direction of a picture based on the picture information supplied from outside and the re-quantization picture information from the re-quantization means for outputting the detected change as the evaluation information, memory means for storing the evaluation information from said evaluation means, comparator means for comparing the current evaluation information from said evaluation means and the temporally previous evaluation information read from said memory means to form output comparison information, and control means for controlling said memory means for storing a smaller one of the value of the current evaluation information supplied from said comparator means and the value of the temporally previous evaluation information read from said memory means in said memory means, and also controlling the re-quantization means to perform re-quantization of the picture information for each block based on the evaluation information stored in the memory means at a time point when an arithmetic and logical operation of evaluation for each block is completed in the evaluation means.

With the adaptive dynamic range encoding device according to the present invention, the evaluation information is found using an equation $$P_1 = W1 \cdot |x-x'| + \Sigma |w2 \, (d-d')|$$

where $P_1$ is the evaluation information, W1 and W2 are pre-set coefficients, x denotes the value of a pixel to be worked on in the block, x' the value of the pixel after the quantization, d a difference between the pixel and a pixel adjacent thereto and d the value of the difference d after quantization, as the evaluation information.

With the adaptive dynamic range encoding device according to the present invention, the evaluation means detects, based on the picture information supplied from outside on the basis of blocks each consisting of a pre-set number of blocks and the re-quantized picture information or the picture information re-quantized by the re-quantization means, the amount of change of the picture in the spatial direction, and transmits the detected amount of change to control means and comparator means.

Specifically, the evaluation means finds the evaluation information using the equation $$P_1 = W1 \cdot |x-x'| + \Sigma |W2 \, (d-d')|$$

where $P_1$ is the evaluation information, W1 and W2 are pre-set coefficients, x denotes the value of a pixel to be worked on in the block, x' the value of the pixel after the quantization, d a difference between the pixel and a pixel adjacent thereto and d' the value of the difference d after quantization.

The control means causes the memory means to store the evaluation information as well as to read the stored evaluation and to supply the read-out evaluation information to comparator means. The comparator means compares the current evaluation information from the evaluation means to the temporally previous evaluation information to supply the result of comparison to the control means as the comparison information. The control means controls the memory means for causing a smaller one of the value of the current evaluation information supplied from the comparator means and the value of the temporally previous evaluation information read from the memory means to be stored in the memory means, while; also controlling the re-quantization means to perform re-quantization of the picture information for each block based on the evaluation information stored in the memory means at a time point when an arithmetic and logical operation of evaluation for each block is completed in the evaluation means.

That is, according to the present invention, re-quantization is performed in accordance with the stored evaluation information in the memory means having the smallest value in the block at a quantization step most suited to the picture of the block. This enables re-quantization to be performed in such a manner so that picture portions having the same level remain at the same level after re-quantization to prevent quantization distortions from being produced in the picture to enable satisfactory picture data to be produced after re-quantization.

Since the re-quantization is performed so that picture portions having the same level remain at the same level after re-quantization, low-level picture data portions may be re-quantized satisfactorily by effectively avoiding adverse effects due to the noise.

Since the adverse effects due to the noise may be avoided in this manner, no distortion is incurred in the picture data and a high-quality picture may be produced even after repeated re-quantization.

DESCRIPTION OF THE PREFERRED EMBODIMENTS

Referring to the drawings, an adaptive dynamic range encoding method and device according to a preferred embodiment of the present invention is explained in detail.

The adaptive dynamic range encoding device of the embodiment illustrated is adapted for compressing picture data, which is the digital data of 720 samples × 488 lines × 2 × 8 bits × 30 frames/sec, approximately equal to 168.7 Mbps, having the sampling frequency ratio of 4:2:2, into data having a data length of approximately one-third on the basis of blocks having a pre-set size. For both the luminance data (Y data) and the chrominance data (C data), the block size of 8 vertical pixels by 8 horizontal pixels, with the bit allocation being 3 bits for the Y data and 2 bits for the C data.

Figure 5:
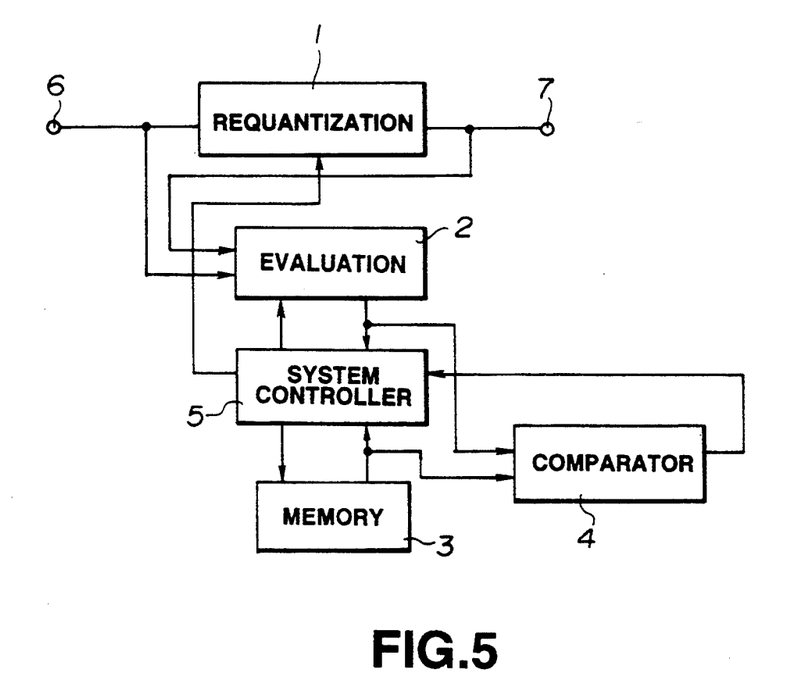
FIG. 5 is a block circuit diagram showing an adaptive dynamic range encoding device embodying the present invention.

Referring to FIG. 5, the adaptive dynamic range encoding device embodying the present invention comprises a re-quantization circuit 1 for re-quantizing picture data (Y data and C data) from an external source, made up of blocks each consisting of 8×8 pixels on the block basis for forming re-quantized output picture data as the re-quantized picture data, and an evaluation circuit 2 for detecting the amounts of change of the picture in the spatial direction based on the picture data from the external source and the re-quantized picture data from the re-quantization circuit 1 for outputting the resulting data as evaluation data or information.

The adaptive dynamic range encoding device also comprises a memory 3 for storing the evaluation data from the evaluation circuit 2 and a comparator circuit 4 for comparing the current evaluation data from the evaluation circuit 2 and temporally previous evaluation data as read from the memory 3 for forming output comparison data or information.

The adaptive dynamic range encoding device also comprises a system controller 5 for controlling the memory 3 to cause the current evaluation data supplied to the comparator circuit 4 or the temporally previous evaluation data as read from the memory 3, whichever is smaller, to be stored in the memory 3, depending on the comparison data supplied from the comparator circuit 4, while controlling the re-quantization circuit 1 to permit the re-quantization of the picture data for the block to be performed, at a time point when the arithmetic and logical operations of the evaluation data for the block are completed in the evaluation circuit 2, on the basis of the evaluation data stored in the memory 3.

The operation of the above-described adaptive dynamic range encoding device is hereinafter explained.

When the re-quantizing operation of the adaptive dynamic range encoding device of the embodiment illustrated is started, the picture data having an 8-bit data length as described above is supplied to an input terminal 6. The picture data thus supplied to the input terminal 6 is supplied to the re-quantization circuit 1 and to the evaluation circuit 2.

The re-quantization circuit 1 performs arithmetic and logical operations in accordance with the following equation (3)

$$DR = MAX - MIN + 1$$
$$Q = [(L - MIN + 0.5) \times 2^n/DR]$$
$$MAX' = L_{Q=2^n-1}$$
$$MIN' = L_{Q=0}$$
(3)

where $L_{Q=i}$ is a mean value of L satisfying Q=i. In the above equation, DR denotes the dynamic range in the block, MAX a maximum value of the dynamic range in the block, MIN a minimum value of the dynamic range in the block, Q the code of re-quantization, n the bit allocation, MAX' the maximum value of the dynamic range in the block after quantization, MIN' the minimum value of the dynamic range in the block after quantization, and L the pixel data level in the block.

Figure 6A:
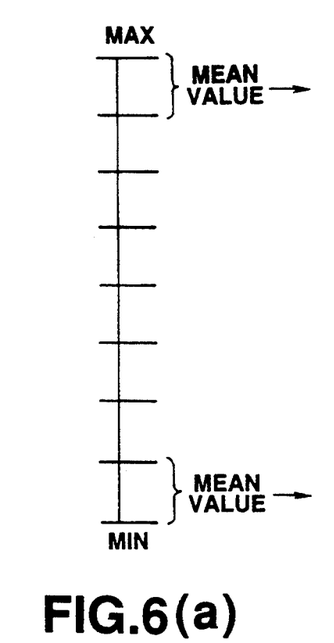
FIGS. 6(a) and 6(b) are diagrammatic views illustrating the operation of re-quantization of the adaptive dynamic range encoding device shown in FIG. 5.
Figure 6B:
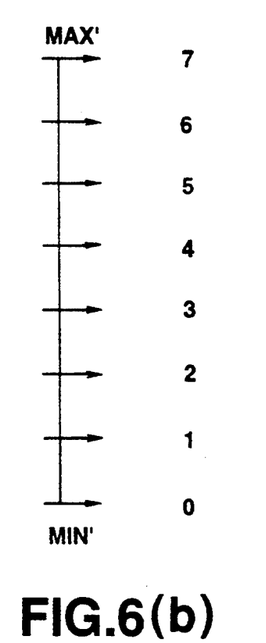

In this manner, the re-quantization circuit 1 finds a mean value between levels of picture data supplied from outside, which value corresponds to the uppermost gradient level for n-bit, herein 3-bit quantization, or the level $2^n - 1$ as explained in connection with the equation 4, as shown in (a) in FIG. 6, to find a new maximum value MAX' of the picture data in the block, as shown in (b) in FIG. 6. Similarly, the re-quantization circuit 1 finds a mean value between levels of the picture data, which corresponds to the lowermost gradient level, as shown in (a) in FIG. 6, to find a new minimum value MIN' of the picture data in the block, as shown in (b) in FIG. 6.

The re-quantization circuit 1 then re-quantizes the picture data supplied from outside by 3-bit re-quantization, based on the newly found maximum value MAX' and minimum value MIN' of the picture data in the block, in accordance with the following equation (4)

$$DR' = MAX' - MIN'$$
$$Q = [(L - MIN') \times (2_n - 1)/DR' + 0.5]$$
$$L' = Q \times DR'/(2_n - 1) + MIN' + 0.5]$$
(4)

where DR' denotes the value after re-quantization of the dynamic range in the block and L' the restored value.

Specifically, the picture data has the bit rate of 720 samples × 488 lines × 2 × 8 bits × 30 frames/sec, approximately equal to 188.7 Mbps, which is changed by re-quantization by the re-quantization circuit 1, to $\{720 \times 488/16 \times 2 + 720 \times 488 \times (3+2)\} \times 30$, approximately equal to 58.0 Mbps, so that the bit rate is compressed to approximately 1/2.9 of the original bit rate.

The picture data, having its bit rate compressed in this manner by the re-quantization circuit 1, is supplied as the re-quantized picture data to the evaluation circuit 2.

The evaluation circuit 2 then executes, based on the picture data supplied from outside and the re-quantized picture data supplied from the re-quantized circuit 2, the arithmetic and logical operations in accordance with the equation (5)

$$P_1 = W1 \cdot |x - x'| + \Sigma |W2 (d - d')| \qquad (5)$$

to find evaluation data $P_1$. In the above equation, x denotes the value of a pixel to be worked on in the block, x' the value of the pixel after the quantization, d a difference between the pixel and a pixel adjacent thereto, that is, a pixel above or below or on one of the lateral sides of the pixel, and d' the value of the difference d after quantization.

In this manner, an evaluation function (evaluation data $P_1$) based on a change in the spatial difference of the picture (d−d') and the quantization error (x−x') is found. The evaluation data is supplied via the system controller 5 to the memory 3 for storage therein.

The re-quantization circuit 1 then executes re-quantization on the next following picture data using equations (3) and (4) to find re-quantized picture data which is supplied to the evaluation circuit 2. The evaluation circuit 2 executes the arithmetic and logical operation on the next following picture data based on picture data before and after re-quantization in accordance with the arithmetic and logical operation shown by equation (5) to form evaluation data which is supplied to the comparator circuit 4 and to the system controller 5. When supplied with the evaluation data of the above-mentioned next following picture data, the system controller 5 controls the memory 3 to cause the temporally previous evaluation data to be read from the memory 3. The temporally previous evaluation data, thus read from the memory 3, is supplied to the comparator circuit 4.

The comparator 4 compares the next following evaluation data, that is, the current evaluation data, to the temporally previous evaluation data, to transmit resulting comparison data to the system controller 5. The system controller 5 causes the memory 3 to select the current evaluation data or the temporally previous evaluation data from the comparator circuit, whichever is smaller, and to store the smaller value evaluation data in the memory 3.

By carrying out the above-described sequence of operations, the evaluation data having the smallest value in the block is stored in the memory 3. The above-described sequence of operations is performed for each of the blocks.

On completion of the above-described arithmetic and logical steps for each of the pixels in the block, the system controller 5 causes the re-quantization circuit 1 to read the evaluation data having the least value in the block from the memory 3 to perform the re-quantization of the picture data of the block based on such evaluation data.

In this manner, it becomes possible to reduce changes in the pixel level values of the pixels in the block and changes in the difference in level of the pixels adjacent to the pixels.

Figure 7:
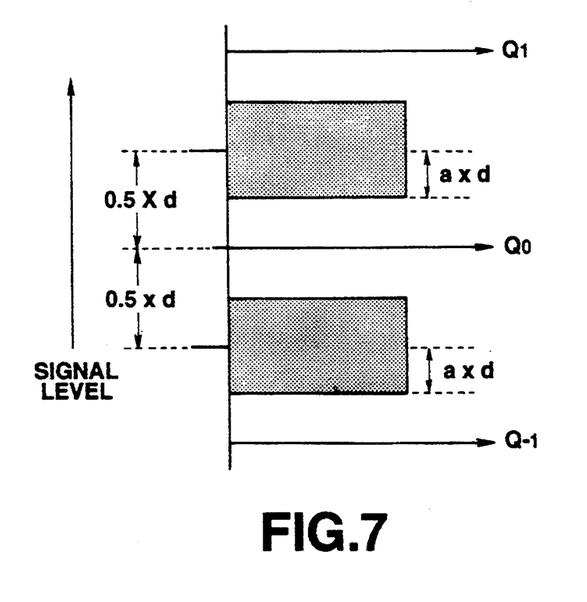
FIG. 7 is a chart showing quantization values above and below pixels present in a boundary region of quantization in the adaptive dynamic range encoding device shown in FIG. 4.

That is, the adaptive dynamic range encoding device of the embodiment illustrated executes re-quantization on a pixel present in a boundary area of quantization as indicated by a hatching in FIG. 7, using two quantization values, that is, an upper quantization value and a lower quantization value. The two re-quantization operations are performed a number of times equal to 2 raised to the nth power, where n is the number of pixels present in the boundary area of quantization. The adaptive dynamic range encoding device re-quantizes the pixels of the block based on the minimum $\Sigma P_1$, which is the sum of the evaluation data in the block, as the evaluation data. It should be noted that the value of n becomes smaller if there is no pixel in the boundary area.

Figure 2A:
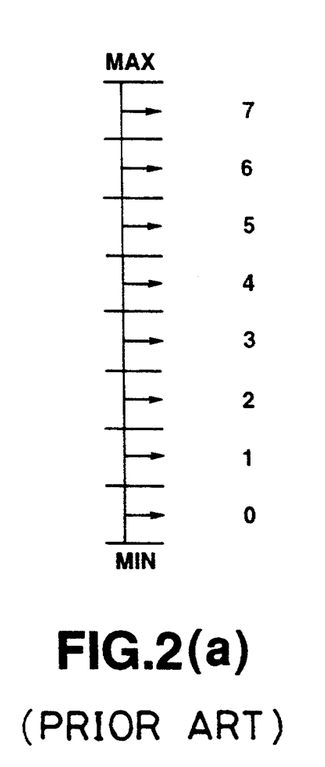
FIGS. 2(a) and 2(b) are diagrammatic views for illustrating the operation of a conventional dynamic range encoding device.
Figure 2B:
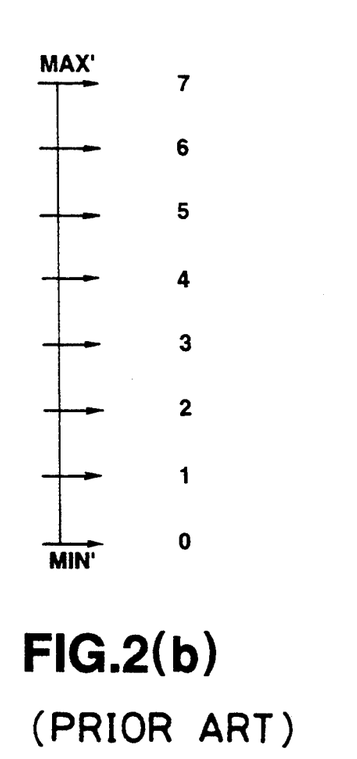
Figure 8:
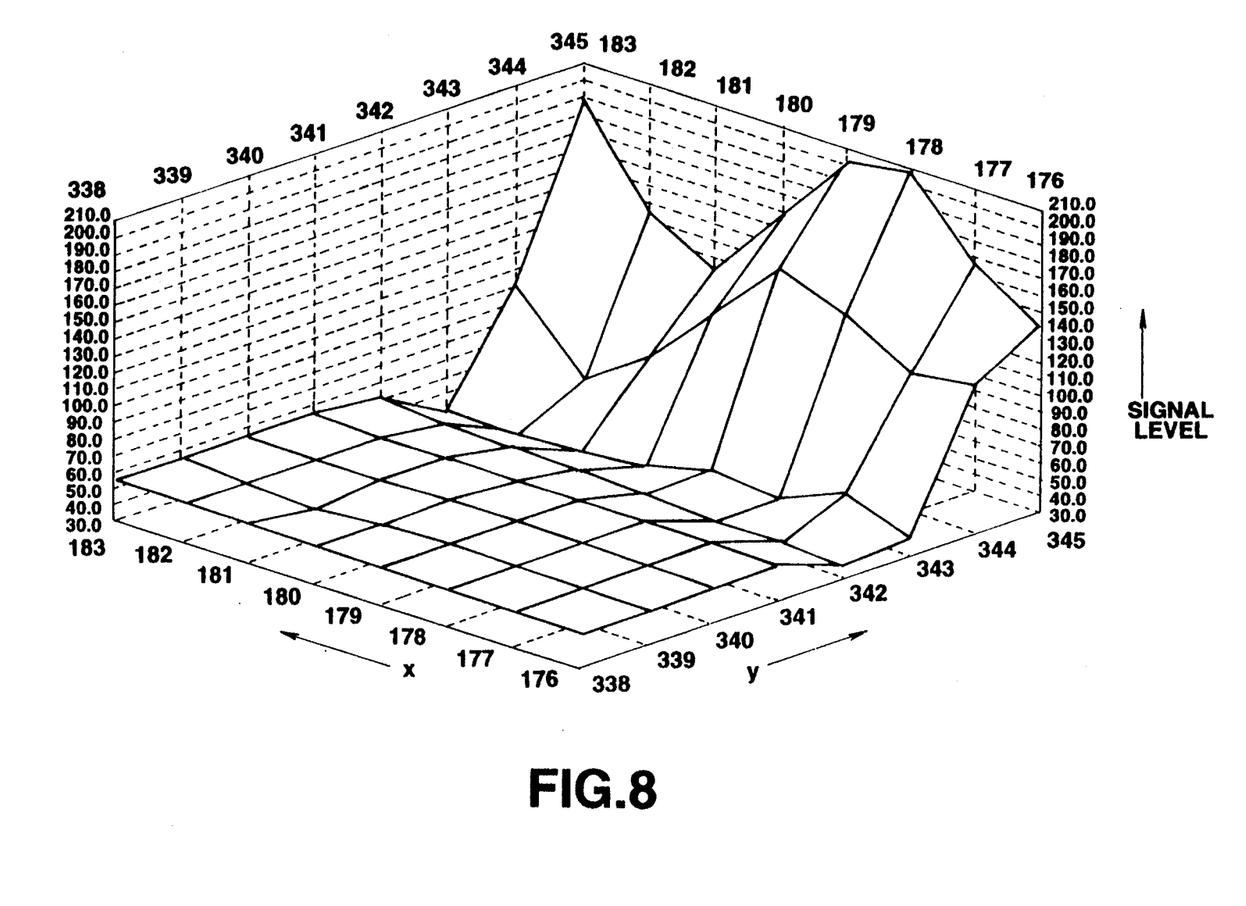
FIG. 8 illustrates the level distribution of picture data prior to pre-processing performed in advance of re-quantization in the adaptive dynamic range encoding device shown in FIG. 4.
Figure 9:
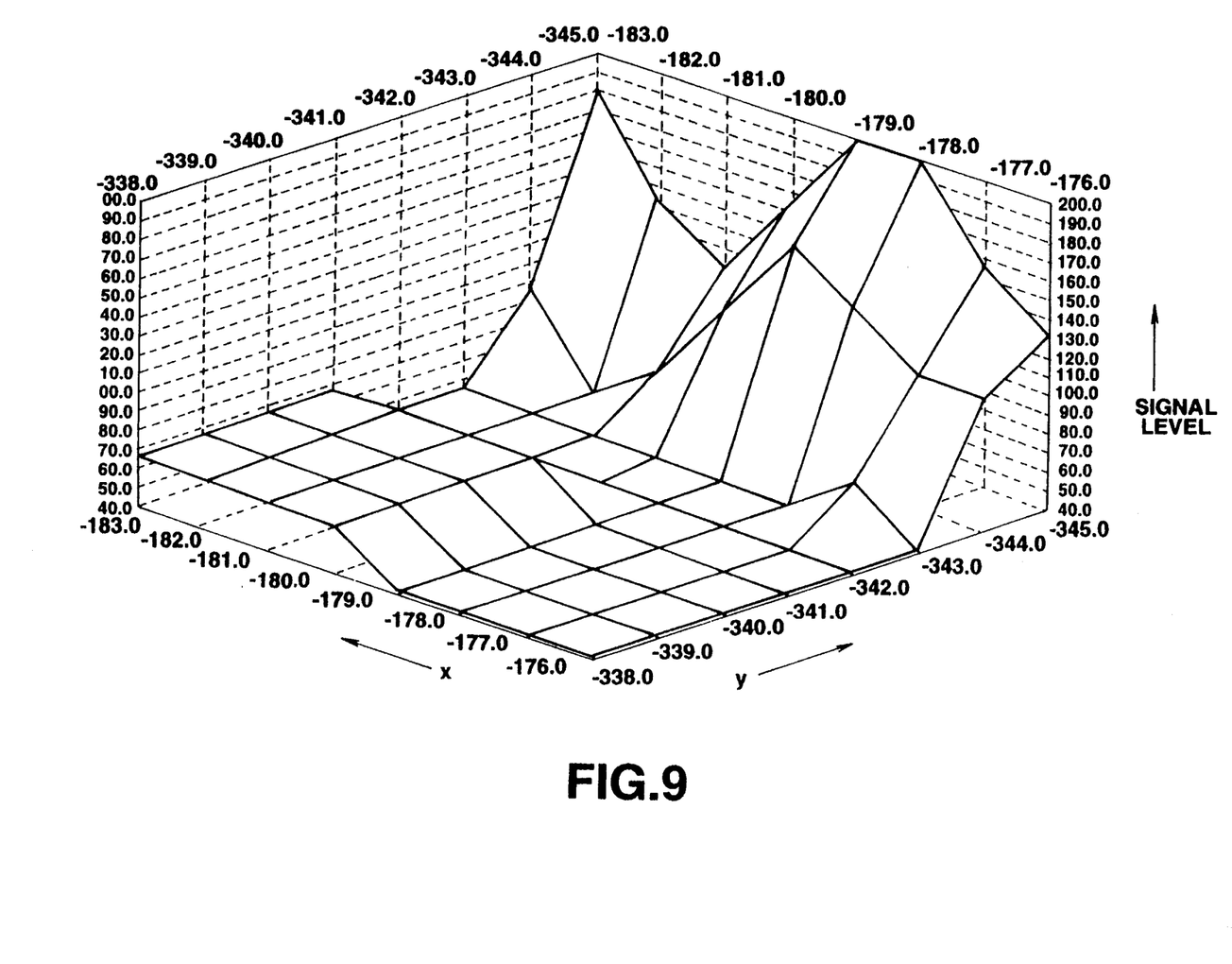
FIG. 9 illustrate the level distribution of re-quantized picture data after the pre-processing in the adaptive dynamic range encoding device shown in FIG. 4.

Specifically, the re-quantization circuit 1 performs the arithmetic and logical operation shown by equation (3) by way of a pre-processing operation of re-defining the dynamic range in the block. By the pre-processing operation, the level distribution of luminance data shown in FIG. 2 becomes the level distribution as shown in FIG. 7. The above-mentioned re-quantization is performed based on the luminance data shown in FIG. 7. It becomes possible in this manner to prevent the picture portions having the same level from assuming different quantized values, such that the re-quantization may be performed to produce the level distribution of the luminance data shown in FIG. 8, in which the picture portions having the same luminance level will have the same quantization levels.

It is seen from above that the present invention provides an adaptive dynamic range encoding device in which, by detecting evaluation data centered about the amount of changes in the spatial direction of the picture data in the block and carrying out the re-quantization which will minimize the value of the evaluation data, the re-quantization may be made with an optimum quantization step conforming to the picture in the block in such a manner that picture portions having the same level will remain at the same level. As a result thereof, quantization distortion of the picture may be avoided so as to render it possible to output picture data which will give a satisfactory picture even after re-quantization.

In addition, because the quantization may be made in such a manner that picture portions having the same level will remain at the same level, low-level picture data portions may be re-quantized satisfactorily by effectively avoiding adverse effects due to the noise.

Since the adverse effects due to the noise may be avoided in this manner, no distortion is incurred in the picture data and a qualitatively satisfactory picture may be produced even after repeated re-quantization.

Although the absolute values of the change (d−d') of the spatial difference of the picture and the quantization errors (x−x') are employed in the evaluation circuit 2 in the above-described embodiment, squared values $(d-d')^2$ or $(x-x')^2$ may also be employed.

On the other hand, although the picture data having the sampling frequency ratio of 4:2:2 is compressed by re-quantization with the above-described adaptive dynamic range encoding device, such arrangement is merely illustrative and any digital picture data having the sampling frequency ratio other than 4:2:2 may be processed with the present device.

What is claimed is:

1. An adaptive dynamic range encoding device for quantized picture information comprising:

re-quantization means, for re-quantizing the quantized picture information supplied thereto on the basis of blocks each consisting of a pre-set number of pixels for forming re-quantized output picture information;

evaluation means for detecting changes in a spatial direction of a picture based on the quantized picture information supplied thereto and the re-quantized output picture information from said re-quantization means and outputting detected changes as evaluation information;

memory means for storing the evaluation information from said evaluation means;

comparator means for comparing new evaluation information from said evaluation means and temporally previous evaluation information read from said memory means to form output comparison information; and control means for controlling said memory means for storing therein a smaller value between the output comparison information supplied from said comparator means and the temporally previous evaluation information read from said memory means, said control means also controlling said re-quantization means to perform re-quantization of the quantized picture information for each block being re-quantized based on the evaluation information stored in said memory means when an arithmetic and logical operation of evaluation for each block is completed in said evaluation means.

2. The adaptive dynamic range encoding device as claimed in claim 1 wherein said evaluation information is found using an equation $$P_1 = W1 \cdot |x-x'| + \Sigma |W2(d-d')|$$

where $P_1$ is the evaluation information, W1 and W1 are pre-set coefficients, x denotes the value of a pixel to be worked on in the block, x' the value of the pixel after the re-quantization, d a difference between the pixel and a pixel adjacent thereto and d' the value of the difference d after re-quantization.

3. An adaptive dynamic range encoding method comprising:

re-quantizing quantized input picture information on the basis of blocks each consisting of a pre-set number of pixels for forming re-quantized picture information;

detecting spatial direction changes of pictures based on said quantized input picture information and the re-quantized picture information and forming evaluation information;

comparing new evaluation information and temporally previous evaluation information and storing a smaller value between the new evaluation information and the temporally previous evaluation information; and re-quantizing the block-based quantized picture information, based on the stored evaluation information when the block-based evaluation is completed.

4. The adaptive dynamic range encoding device as claimed in claim 3 wherein the evaluation information $P_1$ is found using an equation $$P_1 = W1 \cdot |x-x'| + \Sigma |W2(d-d')|$$

where $P_1$ is the evaluation information, W1 and W2 are pre-set coefficients, x denotes the value of a pixel to be worked on in the block, x' the value of the pixel after the re-quantization, d a difference between the pixel and a pixel adjacent thereto and d' the value of the difference d after re-quantization.

* * * * *

UNITED STATES PATENT AND TRADEMARK OFFICE
CERTIFICATE OF CORRECTION

PATENT NO. : 5,444,487

DATED : August 22, 1995

INVENTOR(S) : Tetsujiro KONDO and Kunio KAWAGUCHI

It is certified that error appears in the above-indentified patent and that said Letters Patent is hereby corrected as shown below:

On Title Page, under "Other Publications",
   line 2, change "Prodceed-" to —Proceed—

In the Abstract, line 2, after "vice" insert —,—
Col. 1, line 11, after "device" insert —in—
      line 12, after "picture" insert —data—
Col. 2, line 39, change "deteriorate" to —deteriorates—
      line 42, change "a" to —b—
      line 44, change "Fig." to —Table—
Col. 4, line 5, change "d" to —d'—
      line 43, after "while" delete ";"

Col. 7, line 1, change "188.7" to —168.7—
      same line, change "i s" to —is—

Col. 9, line 3, delete ","

Signed and Sealed this

Eleventh Day of February, 1997

Attest:

BRUCE LEHMAN

Attesting Officer     Commissioner of Patents and Trademarks